US008954940B2

United States Patent
Flicker et al.

(10) Patent No.: US 8,954,940 B2
(45) Date of Patent: Feb. 10, 2015

(54) INTEGRATING PREPROCESSOR BEHAVIOR INTO PARSING

(71) Applicant: International Business Machines Corporation, Armonk, NY (US)

(72) Inventors: Jeremy Flicker, Raleigh, NC (US); Jason C. Garcowski, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 13/650,359

(22) Filed: Oct. 12, 2012

(65) Prior Publication Data
US 2014/0109067 A1    Apr. 17, 2014

(51) Int. Cl.
*G06F 9/44*    (2006.01)

(52) U.S. Cl.
USPC ............ 717/142; 712/234; 717/141; 717/143; 717/129

(58) Field of Classification Search
None
See application file for complete search history.

(56) References Cited

U.S. PATENT DOCUMENTS

| 5,276,880 | A * | 1/1994 | Platoff et al. | 717/143 |
|---|---|---|---|---|
| 5,812,853 | A * | 9/1998 | Carroll et al. | 717/143 |
| 6,954,925 | B1 * | 10/2005 | Kong | 717/143 |
| 7,539,981 | B2 | 5/2009 | Eilebrecht | |
| 7,624,385 | B2 * | 11/2009 | Waddington et al. | 717/143 |
| 8,015,554 | B2 | 9/2011 | Varma | |
| 8,099,722 | B2 * | 1/2012 | Fairweather | 717/143 |
| 8,161,466 | B2 * | 4/2012 | Jeong | 717/140 |
| 8,495,591 | B2 * | 7/2013 | Miceli | 717/129 |
| 2004/0153995 | A1 | 8/2004 | Polonovski | |
| 2006/0225052 | A1 * | 10/2006 | Waddington et al. | 717/136 |
| 2009/0178031 | A1 | 7/2009 | Zhao | |
| 2009/0313604 | A1 | 12/2009 | Miceli | |
| 2013/0152061 | A1 * | 6/2013 | Golde et al. | 717/143 |
| 2013/0326204 | A1 * | 12/2013 | Grimm et al. | 712/234 |

FOREIGN PATENT DOCUMENTS

JP    2000-112768    4/2000

OTHER PUBLICATIONS

Liebig et al., "Analyzing the discipline of Preprocessor Annotations in 30 Million Lines of C Code," AOSD 2011, Mar. 21-25, 2011; pp. 191-202.

* cited by examiner

*Primary Examiner* — Don Wong
*Assistant Examiner* — Devayani R Talukdar
(74) *Attorney, Agent, or Firm* — Holland & Knight LLP; Brian J. Colandreo, Esq.; Jeffrey T. Placker, Esq.

(57) ABSTRACT

A method, computer program product, and system is described. Software code text associated with a software code editor and including one or more preprocessor statements is identified. The software code text is translated into a preprocessor output using one or more preprocessors associated with the software code text. One or more transformations of the one or more preprocessor statements is identified based upon comparing the preprocessor output with the software code text. One or more locations in the software code text associated with the one or more transformations is identified based upon comparing the preprocessor output with the software code text. The software code text is parsed, based upon lexing the software code text to generate an integrated token stream model including a first token stream representing the software code text and one or more other token streams representing the one or more transformations of the software code text.

20 Claims, 5 Drawing Sheets

INTEGRATING PREPROCESSOR BEHAVIOR INTO PARSING

TECHNICAL FIELD

This disclosure relates to parsing software code.

BACKGROUND

In order to create software using various programming languages, programmers may sometimes incorporate preprocessor statements into the text of the software code. Programmers may also sometimes employ various programming language editors (also "editors," "software editors," or "code editors") while composing or editing software code text (also "code text" or "code"). Editors may sometimes include tools for parsing code text and may include various tools to assist in the composing and/or editing of code text.

BRIEF SUMMARY OF THE DISCLOSURE

According to one aspect of the disclosure, a computer-implemented method includes identifying, by one or more computing devices, software code text associated with a software code editor, wherein the software code text includes one or more preprocessor statements. The method further includes translating, by the one or more computing devices, the software code text including the one or more preprocessor statements into a preprocessor output using, at least in part, one or more preprocessors associated with the software code text. The method further includes identifying, by the one or more computing devices, one or more transformations of the software code text, including one or more transformations of the one or more preprocessor statements, based upon, at least in part, comparing the preprocessor output with the software code text. The method further includes identifying, by the one or more computing devices, one or more locations in the software code text associated with the one or more transformations, based upon, at least in part, comparing the preprocessor output with the software code text. The method further includes parsing the software code text, by the one or more computing devices, based upon, at least in part, lexing the software code text to generate an integrated token stream model, wherein the integrated token stream model includes a representation of a first token stream representing the software code text and one or more representations of one or more other token streams representing the one or more transformations of the software code text.

One or more of the following features may be included. Lexing the software code text to generate the integrated token stream model may include generating the first token stream representing the software code text, including lexing the one or more preprocessor statements as one or more adjunct tokens. Lexing the software code text to generate the integrated token stream model may include generating a series of secondary token streams representing replacement text associated with the one or more transformations of the software code text. Lexing the software code text to generate the integrated token stream model may include mapping one or more locations in the first token stream associated with the one or more transformations of the software code text to one or more corresponding token streams included in the series of secondary token streams. Lexing the software code text to generate the integrated token stream model may include mapping one or more token streams included in the series of secondary token streams to one or more corresponding locations in the source code text.

Parsing the software code text may include generating a representative model of the software code text based upon, at least in part, the integrated token stream model, wherein the representative model represents one or more syntactic structures associated with the preprocessor output and wherein the one or more syntactic structures are mapped, based upon, at least in part, the integrated token stream model, to one or more corresponding locations in the software code text. The method may include identifying one or more syntactical issues associated with the software code text based upon, at least in part, one or more of parsing the software code text and applying a syntax-dependent tool to the representative model of the software code text. The method may include providing an indicator of an error associated with the one or more transformations of the software code text. The indicator may include a temporary window activated by an action associated with a location of an instance of the one or more preprocessor statements. One or more of translating the software code text and parsing the software code text may be based upon, at least in part, a user preference.

According to another aspect of the disclosure, a computer program product resides on a computer readable storage medium and has a plurality of instructions stored on it. When executed by a processor, the instructions cause the processor to perform operations including identifying software code text associated with a software code editor, wherein the software code text includes one or more preprocessor statements. The operations further include translating the software code text including the one or more preprocessor statements into a preprocessor output using, at least in part, one or more preprocessors associated with the software code text. The operations further include identifying one or more transformations of the software code text, including one or more transformations of the one or more preprocessor statements, based upon, at least in part, comparing the preprocessor output with the software code text. The operations further include identifying one or more locations in the software code text associated with the one or more transformations, based upon, at least in part, comparing the preprocessor output with the software code text. The operations further include parsing the software code text based upon, at least in part, lexing the software code text to generate an integrated token stream model, wherein the integrated token stream model includes a representation of a first token stream representing the software code text and one or more representations of one or more other token streams representing the one or more transformations of the software code text.

One or more of the following features may be included. Lexing the software code text to generate the integrated token stream model may include generating the first token stream representing the software code text, including lexing the one or more preprocessor statements as one or more adjunct tokens. Lexing the software code text to generate the integrated token stream model may include generating a series of secondary token streams representing replacement text associated with the one or more transformations of the software code text. Lexing the software code text to generate the integrated token stream model may include mapping one or more locations in the first token stream associated with the one or more transformations of the software code text to one or more corresponding token streams included in the series of secondary token streams. Lexing the software code text to generate the integrated token stream model may include mapping one or more token streams included in the series of secondary token streams to one or more corresponding locations in the source code text.

Parsing the software code text may include generating a representative model of the software code text based upon, at least in part, the integrated token stream model, wherein the representative model represents one or more syntactic structures associated with the preprocessor output and wherein the one or more syntactic structures are mapped, based upon, at least in part, the integrated token stream model, to one or more corresponding locations in the software code text. The operations may include identifying one or more syntactical issues associated with the software code text based upon, at least in part, one or more of parsing the software code text and applying a syntax-dependent tool to the representative model of the software code text. The operations may include providing an indicator of an error associated with the one or more transformations of the software code text. The indicator may include a temporary window activated by an action associated with a location of an instance of the one or more preprocessor statements. One or more of translating the software code text and parsing the software code text may be based upon, at least in part, a user preference.

According to another aspect of the disclosure, a computing system includes one or more processor and one or more memory architecture coupled with the at one or more processors. The one or more processors are configured to identify software code text associated with a software code editor, wherein the software code text includes one or more preprocessor statements. The one or more processors are configured to translate the software code text including the one or more preprocessor statements into a preprocessor output using, at least in part, one or more preprocessors associated with the software code text. The one or more processors are configured to identify one or more transformations of the software code text, including one or more transformations of the one or more preprocessor statements, based upon, at least in part, comparing the preprocessor output with the software code text. The one or more processors are configured to identify one or more locations in the software code text associated with the one or more transformations, based upon, at least in part, comparing the preprocessor output with the software code text. The one or more processors are configured to parse the software code text based upon, at least in part, lexing the software code text to generate an integrated token stream model, wherein the integrated token stream model includes a representation of a first token stream representing the software code text and one or more representations of one or more other token streams representing the one or more transformations of the software code text.

One or more of the following features may be included. Lexing the software code text to generate the integrated token stream model may include generating the first token stream representing the software code text, including lexing the one or more preprocessor statements as one or more adjunct tokens. Lexing the software code text to generate the integrated token stream model may include generating a series of secondary token streams representing replacement text associated with the one or more transformations of the software code text. Lexing the software code text to generate the integrated token stream model may include mapping one or more locations in the first token stream associated with the one or more transformations of the software code text to one or more corresponding token streams included in the series of secondary token streams. Lexing the software code text to generate the integrated token stream model may include mapping one or more token streams included in the series of secondary token streams to one or more corresponding locations in the source code text.

Parsing the software code text may include generating a representative model of the software code text based upon, at least in part, the integrated token stream model, wherein the representative model represents one or more syntactic structures associated with the preprocessor output and wherein the one or more syntactic structures are mapped, based upon, at least in part, the integrated token stream model, to one or more corresponding locations in the software code text. The one or more processors may be configured to identify one or more syntactical issues associated with the software code text based upon, at least in part, one or more of parsing the software code text and applying a syntax-dependent tool to the representative model of the software code text. The one or more processors may be configured to provide an indicator of an error associated with the one or more transformations of the software code text. The indicator may include a temporary window activated by an action associated with a location of an instance of the one or more preprocessor statements.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In software development it may be useful to employ preprocessor statements. A preprocessor statement may be included in a portion of code text (e.g., as the first line(s) in a code text file) and may be used with a variety of programming languages (e.g., COBOL, C, and so on). Preprocessor statements may be written using custom syntax and language, which may provide flexibility and customizability to programmers. For example, preprocessor statements may permit programmers to customize their code text, e.g., to make the code more readable for the programmer or others. In certain instances, preprocessor statements may define routines or subroutines to be employed at various locations in the code text, and/or include various types of customizations. In certain instances, a programmer may use a preprocessor statement to define certain strings as substitutes in the code text for operative numbers. For example, as outlined below a programmer in the programming language C may use a preprocessor statement "#define" to specify that all instances of "TRUE" in the code text will be replaced with a "1," all instances of "FALSE" will be replaced with a "0," and all instances of "INTEREST_RATE" will be replaced with "0.156":

| #define | TRUE          | 1     |
|---------|---------------|-------|
| #define | FALSE         | 0     |
| #define | INTEREST_RATE | 0.156 |

In this manner, such a programmer may use the notations "TRUE," "FALSE," and "INTEREST_RATE" throughout the code text in order to make the code text more readable to himself or other programmers. Through the use of a preprocessor, each instance of "TRUE," "FALSE," and "INTEREST_RATE" may then be replaced with "1," "0," and "0.156," respectively, before the code is compiled (or at another time).

It will be understood that the examples above represents only some of many different types of preprocessor statements, which, as noted above, may be employed in a variety of programming languages for a variety of purposes. As a corollary to this flexibility, however, the set of preprocessor statements for a particular programming language may be quite large, and may vary from programmer to programmer and/or from company to company. This may be particularly true for older programming languages, which may have accumulated a great variety of associated preprocessor statement types and syntaxes. Accordingly, the customizable syntax and language that contributes to the utility of preprocessor statements may cause certain preprocessor statements not to be recognized by a compiler or other application as employing valid syntax and language for the applicable coding language. As such, before code text is compiled (e.g., for execution), preprocessor statements may need to be translated by one or more preprocessors into code text that may be understood by the compiler. A preprocessor may be an interpreter of preprocessor statements that may be associated with a compiler or other application or may be a stand-alone application. In certain embodiments, developers may utilize multiple processors which may, for example, be chained together as a series of preprocessors. In certain embodiments, for example, the output of one preprocessor may be the input to another preprocessor. Some (or all) of the multiple preprocessors may employ a custom syntax varying from the syntax of some (or all) of the other multiple preprocessors.

As also noted above, it may also be useful to employ a software editor to write, view and/or edit software code text. An editor may provide a variety of visualization and other tools to assist programmers in writing, viewing and/or editing the code. For example, based on standard syntax associated with a particular programming language certain software editors may analyze code text in order to color-code key portions, variables, classes, commands, and so on. Additionally/alternatively, software editors may provide the ability to alter (i.e., format) the code text by offsetting certain portions of the code text with indents or tabs. This may, for example, improve the visibility of certain relationships within the code text. Software editors may also, for example, provide error-identification analysis. For example, software editors may analyze the syntax of portions of code text to determine whether the code text appropriately follows various conventions of the relevant programming language. Additionally/alternatively, software editors may provide content-assist functionality, which may, for example, offer suggestions to complete a partially typed program statement and/or improve/enhance content based on syntactic analysis of code text. It will be understood that these examples are not exhaustive and that editors may provide a variety of different types of syntax-dependent (and other) tools. Many types of editors may be available. Editors may be specific to a particular programming language or may span multiple languages.

Although editors are useful in a variety of ways, it may be difficult for editors to properly apply their various tools (e.g., syntax-dependent tools) in the context of preprocessor statements. For example, given the large set of possible preprocessors each with potentially unique preprocessor statement syntax (which, as noted above, may vary from individual to individual and/or from organization to organization), a particular software editor may not recognize the syntax and/or language of a particular preprocessor statement. As such, an editor may not be fully able to apply certain syntax-dependent (and/or other) tools to portions of code that include (or otherwise reference) preprocessor statements. For example, a syntax-dependent tool in a particular editor may identify an instance of a preprocessor statement in the body of a code text as an error (or other code anomaly), because it does not match standard syntax for the relevant programming language, even though the preprocessor statement, once translated by one or more preprocessors, may represent fully valid code for that programming language.

In certain embodiments, the presence of unexpected syntax contributed by a preprocessor statement may contribute to other issues as well. For example, the presence of unexpected syntax contributed by a preprocessor statement may prevent a syntax-dependent tool from completing its operation or may result in a product error due to unanticipated behavior of one or more analysis routines when the routines encounter the unexpected syntax.

It may be possible to manually or programmatically provide to an editor translations of various preprocessor statements into valid code text/syntax, but this may be a time-consuming enterprise and may require, for example, that a programmer program his preprocessor twice—once for the preprocessor itself and once for the benefit of the editor so that the editor may understand the transformations made by the preprocessor. In addition to the extra time required, this may introduce further opportunity for error (e.g., copying errors).

In some embodiments, a preprocessor-integrated parsing process ("PIP") process may address these and other issues. For example, a PIP process may identify software code text in a software editor that includes a preprocessor statement, wherein the preprocessor statement may not be recognized as appropriate source code by the applicable editor. The PIP process may employ one or more preprocessors to translate the code text, including one or more preprocessor statements, into a preprocessor output—i.e., code text that follows the standard syntax and vocabulary of the programming language of the identified code text—which may be recognizable as standard (i.e., non-preprocessor syntax) code by the editor. This preprocessor output may then be automatically compared with the original source code text to identify where the preprocessor statements and other transformations are located and what code text they have been translated into by the one or more preprocessors. In certain embodiments, knowledge of these transformations may be used by a language parser to assist with the parsing of the source code text and to build a representative model of the software program that matches the preprocessor output but can also be efficiently mapped to the corresponding locations in the original source code text.

The parsing results may be provided to the software editor so that the editor may apply various syntax-dependent (and other) tools to the original source code text. In this way, a PIP process may permit a programmer to fully utilize the tools of a software editor, without manually providing means of identifying and/or translating each of the preprocessor statements to the editor. As such, a programmer may enjoy the benefits of employing various customized preprocessor statement syntaxes while also enjoying the full benefits of the tools of the software editor, including application of those tools with respect to the preprocessors statements.

Figure 1:
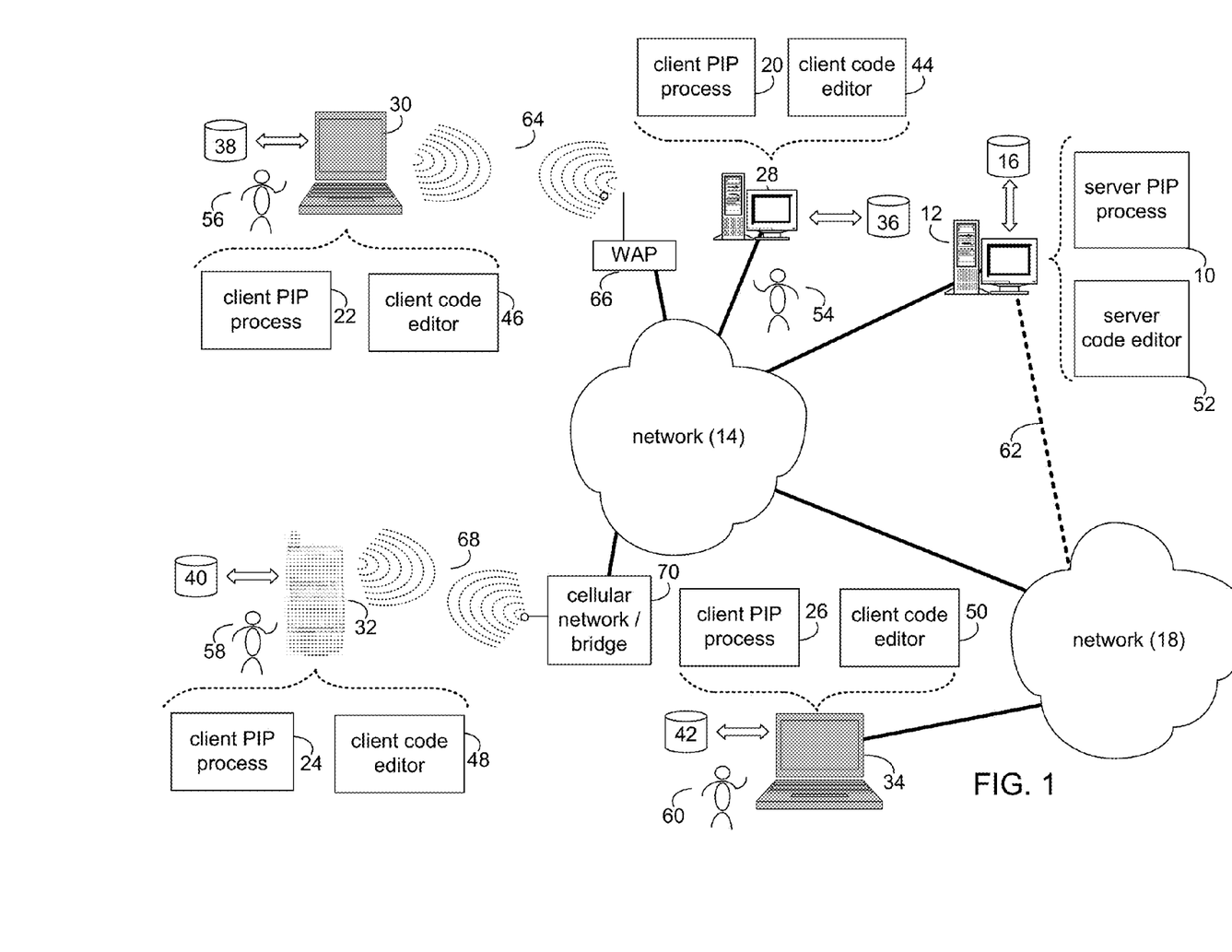
FIG. 1 is a diagrammatic view of a preprocessor statement translation process coupled to a distributed computing network.

Referring now to FIG. 1, a PIP process may be coupled to a computer or computer network. For example, server PIP process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server®: Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server PIP process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademark of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client PIP processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CE®, Red Hat® Linux®, or a custom operating system.

The instruction sets and subroutines of client PIP processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the PIP process may be a server-side process (e.g., which may be implemented via server PIP process 10), in which all of the functionality of the PIP process may be executed on a server computer (e.g., server computer 12). In an embodiment, the PIP process may be a client-side process (e.g., which may be implemented via one or more of client PIP processes 20, 22, 24, 26), in which all of the functionality of the PIP process may be executed on a client computing device (e.g., one or more of client electronic devices 28, 30, 32, 34). In an embodiment, the PIP process may be a hybrid server-client process, in which at least a portion of the functionality of the PIP process may be implemented via server computer 12 and at least a portion of the functionality of the PIP process may be implemented via one or more client computing devices (e.g., one or more of client electronic devices 28, 30, 32, 34).

A software code editor may operate on a client device (e.g., client code editor 44, operating on client electronic device 28; client code editor 46, operating on client electronic device 30; client code editor 48, operating on client electronic device 32; or client code editor 50, operating on client electronic device 34). A client PIP process (e.g., client PIP process 20) and/or a server PIP process (e.g., server PIP process 10) may be in communication with a client code editor (e.g., client code editor 44) or may be part of a client code editor. Further, in some embodiments a client PIP process may be incorporated into (e.g., as a module or component) of a client code editor. As such, at least a portion of the functionality of a client PIP process may be executed or implemented by a client code editor.

A code editor may additionally or alternatively operate on a server device (e.g., server code editor 52, operating on server computer 12 or another server code editor (not shown), operating on another server computer (not shown)). A server PIP process (e.g., server PIP process 10) or a client PIP process (e.g., client PIP process 20) may be in communication with a server code editor (e.g., server code editor 52) or may be a part of a server code editor. Further, in some embodiments a server PIP process may be incorporated into (e.g., as a module or component) of a server code editor. As such, at least a portion of the functionality of a server PIP process may be executed or implemented by a server code editor.

It will be understood that various configurations of a PIP process, a code editor, and one or more preprocessors may be possible. For example, in certain embodiments, a PIP process (e.g., server PIP process 10) a code editor (e.g., server code editor 52) and one or more preprocessors (not shown) may reside on a single computing system (e.g., server computer 12). In certain embodiments, the one or more preprocessors (not shown) may reside on a separate system (e.g., server computer 12 and/or client computing device 28) from a PIP process (e.g., client PIP process 22 residing on client electronic device 30 or server PIP process 10 residing on server computer 12) and/or a code editor (e.g., client code editor 46 residing on client electronic device 30). In this case (and others), the one or more preprocessors, the PIP process and/or the code editor may communicate via various communication links (e.g., network 14). The one or more preprocessor (not shown) may reside on a single electronic device (e.g., server computer 12) or may be distributed among multiple electronic devices (e.g., one preprocessor residing on server computer 12, one preprocessor residing on client electronic device 32, and so on).

Users 54, 56, 58, 60 may access a PIP process in various ways. For example, these users may access server PIP process 10 directly through the device on which a client process (e.g., client PIP processes 20, 22, 24, 26) is executed, namely client electronic devices 28, 30, 32, 34. Users 54, 56, 58, 60 may access server PIP process 10 directly through network 14 and/or through secondary network 18. Further, server computer 12 (i.e., the computer that executes server PIP process 10) may be connected to network 14 through secondary network 18, as illustrated with phantom link line 62. Users 54, 56, 58, 60 may also access a client or server code editor in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client PIP process 20 will be described for illustrative purposes. It will be understood that client PIP process 20 may, for example, interact and/or communicate with a server PIP process such as server PIP process 10 and/or may be executed within one or more applications that allow for communication with other server and/or client PIP processes. PIP process 20 may be utilized as part of or in conjunction with a variety of server and/or client code editor applications, such as client code editor 44 or server code editor 52. This is not intended to be a limitation of this disclosure, as other configurations are possible For example, some implementations may include one or more of client PIP processes 22, 24, 26 or server PIP process 10 in place of or in addition to client PIP process 20. Additionally/alternatively, PIP process 20 may include stand-alone client processes and/or stand-alone server processes, PIP process may be utilized as part of or in conjunction with client code editor 46, 48, 50 or another server code editor or application (not shown), and so on.

Figure 2:
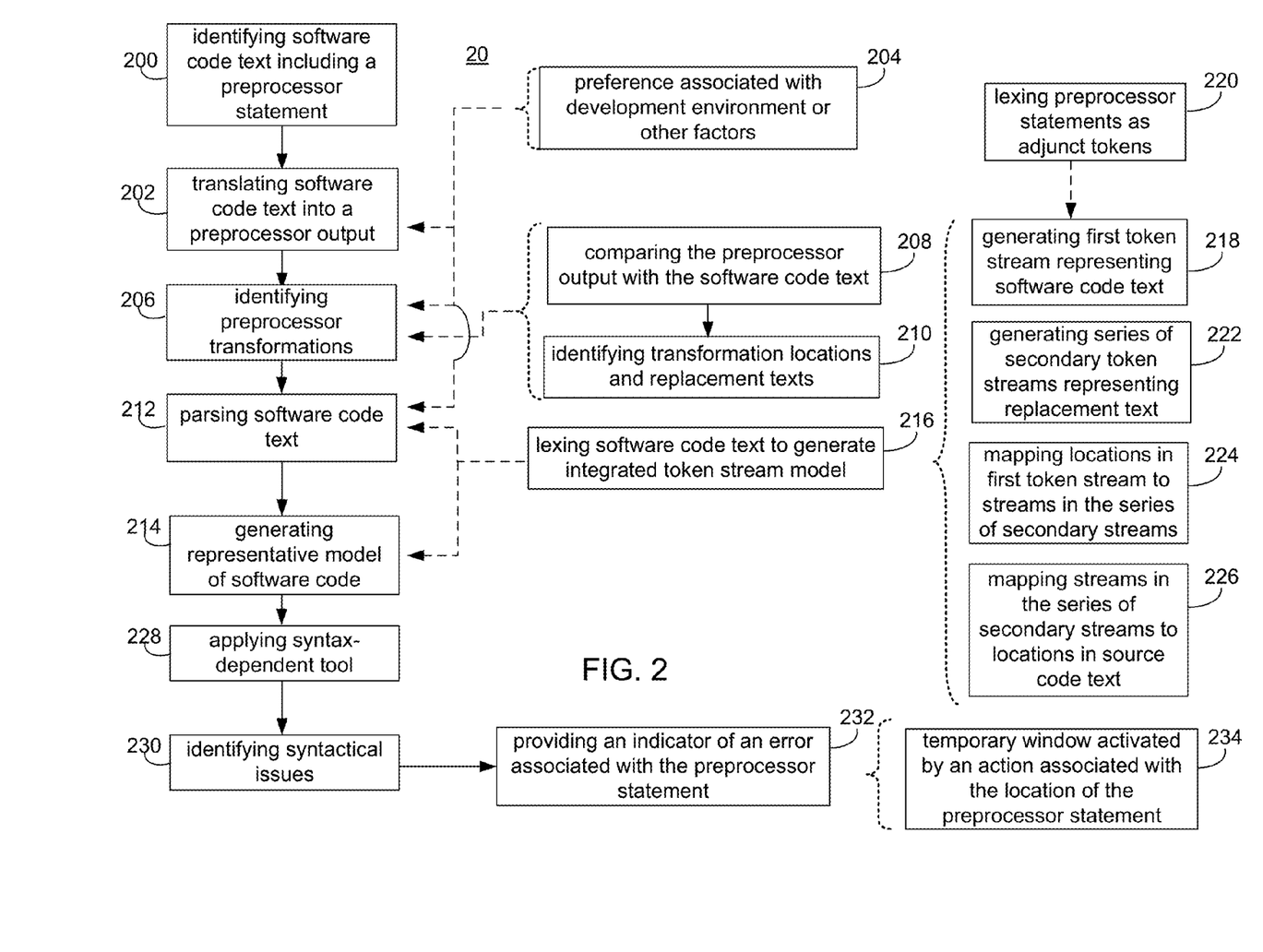
FIG. 2 is a flowchart of a process executed by the preprocessor statement translation process of FIG. 1.

Referring now also to FIG. 2, there is shown a diagrammatic view of an example process that may be implemented by a PIP process, e.g., client PIP process 20. Client PIP process 20 may identify 200 software code text associated with a software code editor, program source file, or other code text source. In some embodiments, a programmer may have entered software code text into a code editor by, for example, typing the code into the code editor manually or by loading the code text into the editor from a file or source code repository. PIP process 20 may identify 200 the code text by, for example, directly accessing the file or data store in which the code text is saved or by receiving the code text from the editor or another application.

The code text identified 200 by PIP process 20 may include one or more preprocessor statements. The preprocessor statements may employ a variety of different formats and/or syntax and may be associated with various locations in the code text. In certain embodiments, it may not be necessary for PIP process 20 to identify which portion of the code text includes a preprocessor statement, as part of identifying 200 the software code text.

Client PIP process 20 may translate 202 the software code text including the one or more preprocessor statements into a preprocessor output. As noted above, a preprocessor output may include one or more transformations of one or more preprocessor statements into a set of expressions that represent the intended functionality of the preprocessor statement and that are expressed using the standard language and/or syntax of the relevant programming language. Additionally/alternatively, a preprocessor output may include one or more changes to the original code text in areas of the source code text that do not include a preprocessor statement. In certain embodiments, a preprocessor output may include one or more changes to the original code text in which a preprocessor statement was removed from the source text and not replaced with any text at all. In certain embodiments a preprocessor output may include translations of preprocessor statements in addition to un-transformed code segments (i.e., code written or presented in standard language and/or syntax of the relevant programming language before being passed to the preprocessor and, in certain embodiments, left unchanged by the preprocessor), wherein the un-transformed code segments may correspond to code segments within the code text that, for example, are not preprocessor statements (e.g., code statements embodied in the code text as standard software code language).

PIP process 20 may translate 202 the software code text including the preprocessor statements into a preprocessor output text using, at least in part, one or more preprocessors associated with the software code text. For example, PIP process 20 may cause one or more preprocessors to transform the software code text into a preprocessor output. As noted above, a preprocessor may be an application or module that translates preprocessor statements into standard language and/or syntax of the relevant programming language. In certain embodiments, a series of preprocessors may be chained together to transform the original source code text through a series of transformations. In certain embodiments, the series of transformations may employ non-standard intermediate language and/or syntax, but may result in a final output containing only standard language and/or syntax. In certain embodiments, one or more preprocessors may be associated with code text, for example, by virtue of the preprocessors being associated with the same programming language as the code text. In certain embodiments, one or more preprocessors may be associated with code text based on a compiler configuration associated with a development environment. One or more preprocessors may additionally/alternatively be associated with code text based on preferences 204 (and/or algorithms) associated with the development environment and/or a particular PIP process (e.g., user preferences and/or algorithms). Preferences 204 may be configured based on a variety of considerations, including, for example, the development processes of the organization for which the code text is being (or was) composed, the particular programmer(s) responsible for the code text, and so on.

A preprocessor, in certain embodiments, may be associated with a compiler. In certain embodiments the preprocessor may be a distinct application from the code editor and may be a stand-alone application or may form part of one or more other applications. In the case that the preprocessor is independent from the code editor, PIP process 20 may, for example, by translating 202 the code text using the one or more preprocessors, translate 202 the preprocessor statement without the editor accessing (or otherwise including or requiring) information defining the syntax and/or language of the preprocessor statement. This may be useful, for example, because it may permit the use of customized preprocessor syntaxes in combination with syntax-dependent tools such as standard code editors, without also requiring the time-consuming entry of various preprocessor statement translation behaviors into the software code editors. In other words, through PIP process 20 programmers may employ a variety of tools and/or editors without concern for whether the tools and/or editors have been programmed to understand a particular preprocessor syntax.

Client PIP process 20 may identify 206 one or more preprocessor transformations in the software code text. This may occur, for example, after the preprocessor output is generated (e.g., through translating 202 software code text into a preprocessor output). A preprocessor transformation may be a transformation of a portion of the code text into different text (e.g., through replacement of the portion of code text, deletion of the portion of the code text or another substitution or change). Identifying 206 preprocessor transformations may be facilitated by, for example, comparing 208 the (un-transformed) software code text with the preprocessor output and analyzing various differences between the two. For example, translating 202 the code text with one or more preprocessors may result in a preprocessor output that varies from the original code text only with respect to the cumulative preprocessor transformations. As such, by comparing 208 the software code text with the preprocessor output, PIP process 20 may identify 210, in the software code text, the locations of one or more preprocessor statements and/or the associated replacement text. In other words, PIP process 20 may identify that while certain portions of software code text (e.g., portions not representing a preprocessor statement) remain unchanged by the one or more preprocessors, certain other portions of the code text (i.e., the portions representing a preprocessor transformation) may have been changed through the translation 202 of the code text. Each difference between the source code text and the preprocessor output may represent the location of a preprocessor transformation of a portion of the source code text (e.g., a transformation to a replacement portion of text that is syntactically-valid in the target programming language), may represent the output of the preprocessor transformation, may represent the location of a preprocessor statement and/or may represent the replacement text of a preprocessor statement translation. In certain embodiments, PIP process 20 may identify 206 only preprocessor transformations that are significant, as determined, for example, based on a preference 204 or other factor.

Transformations of code text (i.e., preprocessor transformations) may include, for example, the replacement of text containing preprocessor-specific syntax with syntactically valid code text, the insertion of new syntactically-valid code text, and/or other modification or removal of previously existing source code text (including preprocessor statements and/or syntactically-valid source code text). In certain embodiments, the insertion of code text by a preprocessor into the preprocessor output without modifying the surrounding text may be described as an empty preprocessor statement occurring at the location where the text is inserted.

As also noted above, identifying 206 preprocessor transformations may, in certain embodiments, be based upon, at least in part, preferences 204 (and/or algorithms) associated with a development environment and/or PIP process 20. For example, in certain embodiments, preferences 204 may indicate which types of preprocessor transformations are syntactically significant. For example, because certain preprocessors statements may cause changes to the code text that are cosmetic in purpose but are not associated with semantic change to the program, such statements may not correspond to significant preprocessor transformations. Accordingly, in certain embodiments, such transformations may not be identified 206 by PIP process 20 because they may not be semantically significant. For example, a preprocessor may (among various other transformations to the source code text) change the capitalization of every letter to be upper case, or remove trailing white space from the end of every line. A simplistic comparison routine may determine that because every line of the original source code text seems to be modified (i.e., by changes to capitalization or whitespace), the entire source code text may be regarded as a single preprocessor statement. Since these types of transformations, however, may not represent the translation of non-language syntax into language syntax, by ignoring them (e.g., based on PIP process 20 not identifying 206 such statements for analysis), a comparison algorithm (e.g., an algorithm implemented as part of comparing 208 the preprocessor output with the software code text) may focus on changes more likely to represent non-language syntax into language syntax. Accordingly, for example, PIP process 20 may permit preferences 204 to be set (e.g., by a user or administrator) whereby PIP process 20 (or another process) may be configured to ignore certain preprocessor transformations when identifying 206 preprocessor transformations.

In certain embodiments, in order to determine a set of preferences 204, PIP process 20 may present a user with a list of particular preprocessor transformations which should be ignored by PIP process 20. For example, the user may be presented with options to ignore changes to whitespace characters or to ignore changes in letter casing. In certain embodiments, a user may be able to provide a customized list of preprocessor transformations which should be ignored by PIP process 20.

Client PIP process 20 may parse 212 the software code text using the identified 206 preprocessor transformation(s). In this way, for example, PIP process 20 may facilitate interpreting the non-standard syntax of the preprocessor statements associated with various transformations. Parsing 212 may include two stages. The first stage of parsing may be referred to as "lexing" and may include the generation of a token stream by which an input character stream may be split into a stream of tokens representing the input symbols or expressions. For example, in the case of software code included in a code editor, lexing may include converting the words and/or symbols of the code text, separated by whitespace, into a stream of tokens that may represent those words and/or symbols and may include a reference to the locations of the words and/or symbols in the source code text.

The second stage of parsing may include syntactic (i.e., syntax-dependent) analysis, whereby the syntax of a stream of tokens is analyzed to identify various expressions. For example, PIP process 20 may identify the existence and/or validity of a particular expression based, for example, on the syntax-related rules of the particular programming language utilized in the parsed code text. As will be discussed in greater detail below, the second stage of parsing 212 may include generating 214 one or more models representing the structure of the software program represented by the code text. PIP process 20 may parse 212 the code text using, for example, a parser associated with code editor or may employ a different parser.

In certain embodiments, parsing 212 the software code text may be based upon, at least in part, preferences 204. For example, in the second stage of parsing 212, PIP process 20 may ignore certain transformation (e.g., cosmetic transformations) in order to focus analysis on syntactically relevant (or otherwise important) information.

In certain embodiments, as part of the first stage of parsing 212 the software code text, PIP process 20 may override the default (or other) lexing behavior of a parser to facilitate successful generation of tokens. For example, a parser may employ specific rules regarding how to break a stream of text into tokens, which may be based, for example, on the grammar of a particular programming language. Because preprocessor statements may deviate from the expected language syntax, however, in certain embodiments preprocessor statements may inhibit the ability of the default (or other) behavior of a code parser to properly generate a list of tokens during the lexing process. As such, it may be useful for a lexer to be able to tolerate unexpected syntax (e.g., as may be located within preprocessor statements) and it may therefore be useful for PIP process 20 to override the inadequate default behavior.

It will be understood that PIP process 20 may include a parser or a portion of a parser, and/or may be associated with and/or communicate with a separate parser or parsers. Further, it will be understood that in parsing 212 the software code text, a parser may base its analysis on a stream of tokens that represents the software program in the language syntax the parser is designed to analyze. As such, for example, if the parser were to receive the tokens from a preprocessor statement it may analyze the non-standard syntax of the statement to be an error. Similarly, the unexpected syntax may prevent the parser from completing its analysis successfully. It may also be important that the tokens of the lexed stream be associated with correct information regarding their location in the original code text or preprocessor transformation replacement text.

It may be useful, therefore, in certain embodiments, for PIP process 20 to facilitate the successful generation of tokens during the lexing process by overriding the default (or other) token generation behavior of the parser for those portions of source code text associated with identified 210 locations of preprocessor transformations. In one embodiment, for example, PIP process 20 may lex 216 one or more preprocessor statements to generate an integrated token stream model. An integrated token stream model may be a representation, in one or more token streams (or otherwise), of the code text and relevant transformations thereto. For example, in certain embodiments, an integrated token stream model may include a first token stream, representing the software code text, and a second token stream, representing the preprocessor output or the transformations effected by the preprocessor(s). In certain embodiments, an integrated token stream model may additionally/alternatively include a first token stream, representing the software code text, and a series of smaller token streams, wherein each token stream included in the series may represent a particular transformation of a particular portion of the software code text. In this way, for example, an integrated token stream model may efficiently represent the un-transformed software code text and the particular transformations of the code text, while, for example, permitting PIP process 20 to easily map particular transformations (and/or errors associated with those transformations or other errors) to appropriate locations in the un-transformed code text. For example, in certain embodiments, an integrated token stream model may be traversed by a parser as if including a single token stream representing a full preprocessor output. For example, the parser may traverse the integrated token stream model by traversing the first token stream (i.e., the token stream representing the un-transformed code text) and referring to the appropriate token stream in the series of token streams to identify particular transformations.

In certain embodiments, lexing 216 the software code text may include generating 218 a first token stream representing the software code text. Generating 218 the first token stream may include, in certain embodiments, lexing 220 one or more preprocessor statements included in the software code text as one or more adjunct tokens, using the identified 210 locations of preprocessor transformations to override the default behavior of the lexer. By, for example, overriding the default lexer behavior to generate a single adjunct token for the text of an individual preprocessor statement, the lexer may not have to break up the text of a preprocessor statement into a series of individual tokens. This may be useful in that the unique syntax of the preprocessor statement text may prevent the default behavior of the lexer from properly identifying individual tokens. (An adjunct token may be, for example, is a non-significant token in a program such as a code comment. Code comments may include non-code text (often denoted with a special syntax, e.g., all lines starting with "*" are treated as comments) and may, for example, permit programmers to indicate the thought process or logic underlying a portion of code, to offer thoughts on possible improvements, to flag potential issues, and so on, without changing the way in which the code text will be executed.) By lexing 220 preprocessor statements as adjunct tokens (i.e., tokens which are not significant to program execution) PIP process 20 may facilitate, for example, generating 214 representative models of the source code text (e.g., abstract syntax trees and symbol tables) that represent only the portions of the code text which affect program execution.

In certain embodiments, PIP process 20 may generate lists of replacement tokens based on the identified 210 replacement text of the associated preprocessor transformation, and map these replacement tokens to corresponding adjunct tokens associated with the location of a preprocessor transformation. In this way, for example, by overriding default (or other) lexing behavior when lexing preprocessor transformations, PIP process 20 may facilitate avoidance of lexing errors resulting from non-standard syntax within a preprocessor statement. In certain embodiments, the use of a specific adjunct type to represent the replaced portions of preprocessor transformations may allow simple identification of these tokens when examining the generated token stream.

Lexing 216 the software code text may include generating 222 a series of secondary token streams representing replacement text associated with transformations of the software code text by the preprocessor(s) (i.e., text included in the preprocessor output that varies from the text of the un-transformed software code text). For example, as also noted above, in certain embodiments, the series of secondary token streams may include one or more streams, each representing a particular portion of replacement text associated with a particular transformation of the software code text by the preprocessor(s). (As also noted above, it will be understood that "replacement text" may refer to replacement of preprocessor statements, whitespace, or other software code text with text or with nothing. In other words, replacement text may indicate actual text that will replace software code text—including, e.g., preprocessor statements—and/or may indicate that a portion of software code text—including, e.g., preprocessor statements—will be deleted.)

Lexing 216 the software code text may include mapping 224 one or more locations in the first token stream associated with one or more transformations of the software code text (e.g., as identified by comparing 208 the preprocessor output with the software code text) to one or more corresponding token streams included in the series of secondary token streams. For example, as noted above, PIP process 20 may generate 222 a series of secondary token streams, wherein each token stream in the series of secondary token streams represents replacement text associated with transformations of portions of the software code text by the preprocessor(s). As such, GP process 20 may map 224 a location in the first token stream that has been identified 206 as representing a transformed portion of the software code text to the particular token stream in the series of token streams that represents that transformation of that portion of the software code text.

Lexing 216 the software code text may include mapping 226 one or more token streams included in the series of secondary token streams to one or more corresponding locations in the source code text. This may be useful, for example, if PIP process 20 identifies an error (or other issue) associated with a particular transformation (i.e., an error (or other issue) associated with a particular token stream included in the series of secondary token streams). In that case, for example, mapping 226 may facilitate also associating the error with the appropriate location in the source code text.

In this way, for example, the parser (and/or other syntax-dependent tools) may perform various forms of traversal of the token model. For example, in one embodiment, as part of the second stage of parsing 212 the software code text, a parser may traverse a stream of tokens that syntactically matches the preprocessor output (which may be in a syntax that the parser may understand), by traversing the original token stream and whenever it encounters an adjunct representing a preprocessor transformation, ignoring that adjunct and instead traverse the stream of tokens for the corresponding preprocessor replacement text (as indicated, for example, by mapping 224) before returning to the next token in the original token stream. Further, in certain embodiments, issues (or other information) identified by the parser may be associated with appropriate locations in the code text based (as indicated, for example, by mapping 226).

An integrated token stream model may also facilitate alternative methods of traversal for other parsing and/or syntax-dependent tools. For example, an integrated token stream may facilitate traversal of the original token stream to analyze a representation of the original, un-transformed code text. Regardless of the traversal methodology, each token encountered may still be mapped to its proper location in the original source code text or preprocessor transformation replacement text allowing features such as error detection and syntax highlighting to be correlated to the appropriate locations in the original source text.

Client PIP process 20 may (e.g., as part of parsing 212 the software code text) generate 214 one or more representative models of the software code text. In certain embodiments, a representative model may represent one or more syntactic structures associated with the preprocessor output. For example, PIP process 20 may generate 214 an abstract syntax tree ("AST") representing the software code text. An AST may be an ordered tree representing the syntactic structure of the code text according to a relevant grammar (e.g., the grammar associated with the particular programming language embodied in the code text). An AST may represent, for example, the organization of a token model (e.g., an integrated token model) into structures representative of the programming language statements present in the source program. PIP process 20 may generate 218 a representative model of the software code employing an internal process, an application or process associated with a code editor or a separate application or process.

In certain embodiments, generating 214 a representative model of the software code text may be based upon, for example, the integrated token stream model. As such, in certain embodiments, the syntactic structures represented in the representative model may be mapped to corresponding locations in the software code text based upon the integrated token stream model. For example, as noted above, an integrated token stream model may include representations of a first token stream representing the un-transformed code text and may further include a series of secondary token streams representing replacement text associated with various preprocessor transformations. Additionally, locations in the first token stream (e.g., locations that may be syntactically transformed by the preprocessor(s)) may be mapped 224 to corresponding streams in the series of secondary streams (e.g., streams representing the replacement text associated with the transformation) and token streams in the series of secondary streams may be mapped 226 to locations in the source code text. Therefore, based on the correspondence between the first token stream and the software code text, PIP process 20 may generate 214 a representative model of the software code text that includes representations of syntactic structures associated with the code text (including syntactic structures associated with preprocessor output) and in which the representations of the syntactic structures are appropriately mapped to corresponding locations the software code text.

The features above may, for example, facilitate a representative model (e.g., an AST) representing the structures present in the preprocessor output that cannot be interpreted by examining the original source code text without an understanding of how the preprocessors are configured to behave. In this way, for example, an AST may match preprocessor statements translated 202 by the preprocessor into standard syntax for the relevant programming language with the mapped correct locations in the source code text or the preprocessor transformation replacement text. This may, for example, facilitate syntactical analysis of the code text including the translated preprocessor statements in order to identify, for example, syntactical issues or other errors or anomalies. In other words, for example, in order to generate 214 a representative model of the software code that incorporates preprocessor transformations and identifies syntactical issues, PIP process 20 (or an associated parser) may traverse the various token streams of the integrated token stream model. In traversing the integrated token stream model, PIP process 20 may utilize mapping 224 and mapping 226 to analyze the model as if it were a single stream representing the full preprocessor output (and all associated syntactic structures), while preserving the ability to efficiently map such syntactic structures to the code text (i.e., through the correspondence between the first token stream—the stream representing the un-transformed code text—and the code text).

Additional/alternative models of the software code text may be generated 214 and/or may be derived by further transformations applied to earlier-generated 214 models. These may include, for example, models of program execution flow, models of program data flow, and models of cross-references between program elements such as variables and methods.

Client PIP process 20 may apply 228 a syntax-dependent tool to a portion of the software code text. A syntax-dependent tool may take a variety of forms. For example, a syntax-dependent tool may analyze the syntax of a segment of code in order to apply a visual indicator related to code segment type or content: e.g., in order to determine whether that segment should be represented in a particular color or other embellishment. A syntax-dependent tool may additionally/alternatively indicate, based on analysis of the syntax of a segment of code, that the code segment includes a syntactical (or other) error or anomaly. A syntax-dependent tool may additionally/alternatively provide suggestions for content-related additions, deletions, and/or changes—i.e., a content-assistance proposal tool. It will be understood that the discussion above is not exhaustive and that PIP process 20 may apply a variety of syntax-dependent tools to code text. PIP process 20 may apply 228 a syntax-dependent (or other) tool that is associated with the code editor or a separate syntax-dependent (or other) tool.

PIP process 20 may apply 228 a syntax-dependent tool based upon, at least in part, generating 214 a representative model of the software code text. For example, as noted above, parsing 212 the code text be based on a generating 214 a token model representing the source text and preprocessor transformation replacement text. Further, parsing 212 the software code text may include generating 214 representative models of the software code that may include a reference to tokens from the translated preprocessor statements. PIP process 20 may use this information in order to apply 228 the syntax-dependent tool to the original source code text, to the preprocessor translation replacement text, or to a combination of the two. In this way, PIP process 20 may, for example, apply 228 a syntax-dependent tool associated with a software code editor to identify a syntactical error in a preprocessor statement—as translated by a preprocessor—or in the source code text before or after a preprocessor statement without the editor itself being required to translate (or otherwise independently interpret) the preprocessor statement.

PIP process 20 may identify 230 one or more syntactical issues associated with the software code text (e.g., syntactical errors, locations for syntactical improvements, and so on) based on applying 228 a syntax-dependent tool. For example, as noted above, a syntax-dependent tool may indicate, based on analysis of the syntax of a segment of code, that the code segment includes a syntactical (or other) error or anomaly. A syntax-dependent tool may additionally/alternatively provide suggestions for content-related additions, deletions, and/or changes—i.e., a content-assistance proposal tool. It will be understood that the discussion above is not exhaustive and that PIP process 20 may apply a variety of syntax-dependent tools to code text. In certain embodiments, PIP process 20 may identify 230 one or more syntactical issues associated with the software text based on parsing 212 the software code text.

PIP process 20 may apply a variety of software editing tools, including tools that are not dependent on syntax or syntactical analysis, and such tools may additionally/alternatively be applied to the code text based upon, at least in part, parsing 212 the code text. A syntax-dependent tool may be applied to the same portion of code text that is identified 206 as a preprocessor transformation, or to a different and/or overlapping portion of code text. In certain embodiments, based upon parsing 212 the code text (or other processes or information), syntax-dependent tools may not be applied to certain instances of a preprocessor statement. For example, in certain embodiments, when applying 228 a particular syntax-dependent tool PIP process 20 may cause the tool to skip over locations of preprocessor transformations so as to apply such tool only to code text that does not include a preprocessor statement. In certain embodiments, PIP process 20 may apply 228 (or not apply) syntax-dependent or other tools based on preferences 204.

Client PIP process 20 may provide 232 (e.g., in the software code editor or elsewhere) an indicator of an error associated with the one or more preprocessor statements. PIP process 20 may provide 232 the indicator based upon, at least in part, parsing 212 the software code text or generating 214 a representative model of the software code. For example, errors detected during parsing 212 of the source code text (or otherwise) may be reported at (or near) the location of a particular token within the generated 214 token model representing the source text and preprocessor transformations. If, for example, the token associated with the error is one of the preprocessor translation replacement text tokens (e.g., a token included in a generated 220 stream of tokens), PIP process 20 may identify that a corresponding preprocessor statement adjunct token (e.g., a generated 216 token) represents code text containing an internal error (or other anomaly) or otherwise introducing an error (or other anomaly) into the code text. Because the preprocessor statement adjunct token may be mapped to the correct corresponding location in the source code text, an indicator of the error may accordingly be provided 232 at (or near) the correct location in the source code text. For example, continuing the example above, if a preprocessor statement has specified that all instances of "TRUE" in a code text are to be replaced by "1," and the word "TRUE" has been employed in the code text in a way that is incompatible with the use of "1," PIP process 20 may identify that this preprocessor statement will introduce an error into the code text. Accordingly, PIP process may provide 232 an indicator of such an error (or anomaly) or other errors (or anomalies) at or near the location of the preprocessor transformation in the source code text.

It will be understood that an error (or anomaly) associated with a preprocessor statement (or other code segment) may be an error (or anomaly) inherent to the translated preprocessor statement (or other code segment) itself or may be an error stemming from the way (or location) in which the preprocessor statement (or other code segment) is used in the code text. For example, a translated preprocessor statement may not itself contain an error, but may be implemented in such a way as to introduce an error into surrounding (or otherwise associated) standard code. This may occur, for example, if a preprocessor statement provides an output or requires an input that is incompatible with its context and/or location.

An indicator of an error (or other anomaly) may take a variety of forms. For example, an error may be indicated by a change in the text color, font, highlighting and so on of relevant code segments. For example, if a syntax-dependent tool identifies an error associated with a preprocessor statement, one or more locations of those preprocessor statements may be indicated by changing the font of the preprocessor statement at those locations to bright red, by highlighting those locations in yellow, or by otherwise marking the particular location or statement. Additionally/alternatively, the indicator may include a temporary window 234 activated by an action associated with the location of the instance of the one or more preprocessor statements. For example, when a user indicates an interest in a preprocessor statement with an associated error (e.g., by placing a mouse cursor near the code segment, highlighting the segment with the mouse, tabbing to the segment, and so on) a temporary window 234 may appear. In certain embodiments the temporary window 234 may expand the preprocessor statement into a corresponding portion of the preprocessor output (i.e., the translation of the preprocessor statement). In certain embodiments the window may include an indication of the error type and/or location. For example, if the window includes the translation of the preprocessor statement and the error is associated with a location within the translation, the window may include an indication of the error at or near that location.

It will be understood that use of such a temporary window may not be limited to indicating errors (or anomalies). For example, it may sometimes be useful for a programmer to see a translation of a preprocessor statement in its corresponding context. Accordingly, PIP process 20 may provide 232 a temporary window 234 associated with preprocessor statements that do not contain errors, whereby a user may view the translation of the preprocessor statement in the window. Within the window 234, PIP process 20 may additionally/alternatively provide other syntax-dependent features such as color coding and other navigation and visualization features.

Similarly, other indicators may not be limited to denoting errors (or anomalies). For example, PIP process 20 may, based upon identifying 210 the location of preprocessor transformations in the code text, indicate (or cause a separate process—e.g., a code editor—to indicate) each location of a transformation through a change in the appearance of the code text at that location (or through another indicator).

In certain embodiments, PIP process 20 may be implemented automatically. For example, PIP process 20 may be variously implemented each time that a user adds or edits a preprocessor statement (or other code segment), each time that a user saves the code text through the editor, every 20 seconds, and so on. In certain embodiments, PIP process 20 may be implemented manually. For example, a user may trigger implementation of PIP process 20 by selecting an associated icon or entering an associated keyboard command.

In certain embodiments, the locations of preprocessor statements in the code text may be dynamically updated as the code text is updated in various ways. In certain embodiments, the locations of preprocessor statements (and/or associated translations from the preprocessor) may be preserved across the opening/closing of the editor (and/or the code text file) and across workspace restarts.

Figure 3:
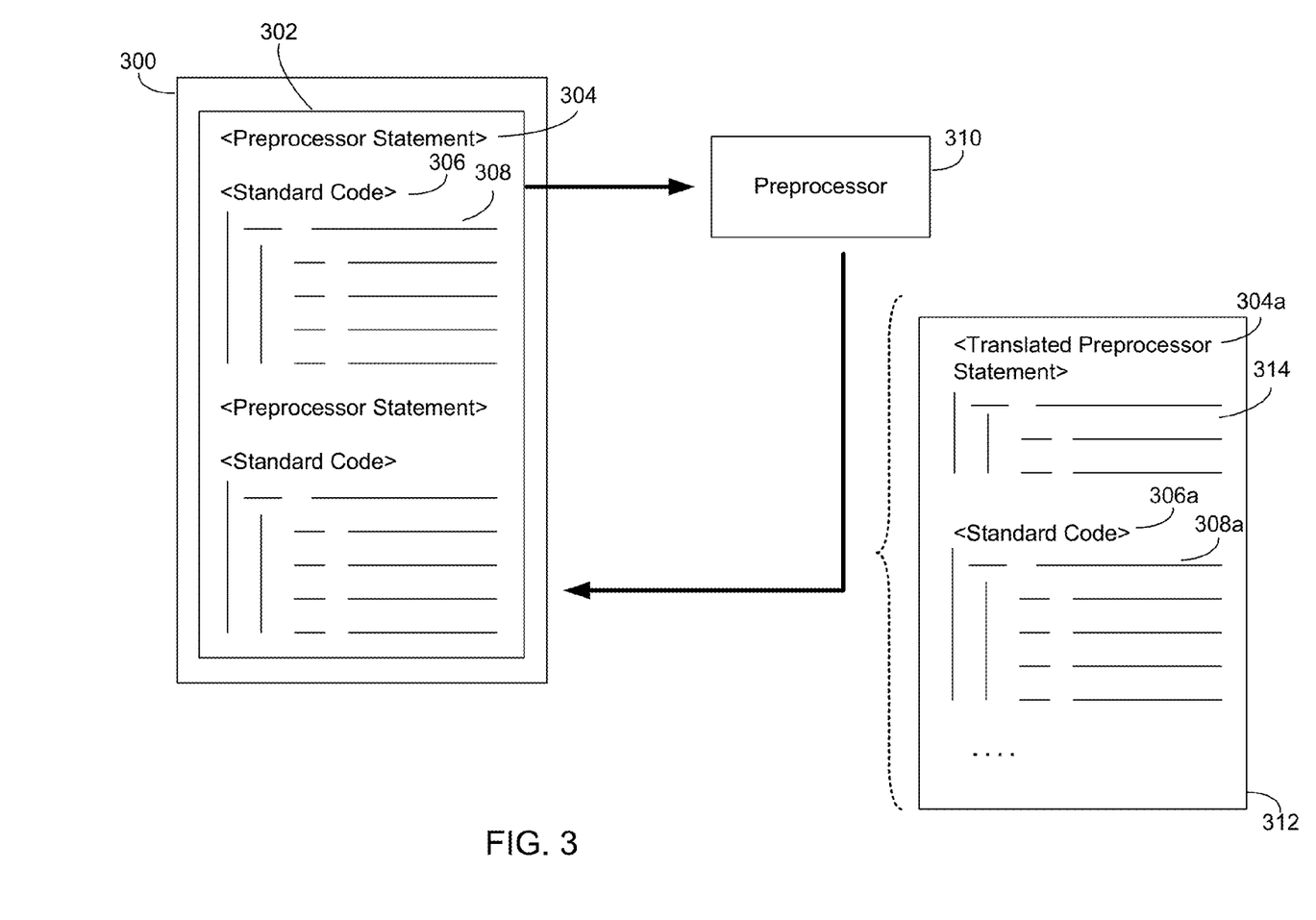
FIG. 3 is a diagrammatic view of an implementation of the preprocessor statement translation process of FIG. 1.

Referring now also to FIG. 3, an implementation of PIP process 20 is shown. In FIG. 3, code editor 300 includes code text 302, which may include various preprocessor statements (e.g., preprocessor statement 304), and various portions of standard code (e.g., standard code portion 306) with various routines and subroutines (e.g., subroutine 308). PIP process 20 may translate 202 code text 302 into preprocessor output 312 using preprocessor 310 (and/or one or more other preprocessors (not shown)). Through the use of preprocessor 310, preprocessor output 312 may include translated preprocessor statement 304a, which may correspond to preprocessor statement 304 in original code text 302. Further, based on the translation 202 of code text 302 using preprocessor 310, translated preprocessor statement 304a may include preprocessor subroutine 314, which may be present in code text 302 only inasmuch as it is implied (from the perspective of the preprocessor) by preprocessor statement 304. Because standard code 306, including subroutine 308, does not include a preprocessor statement, it may not be changed by preprocessor 310. Accordingly, preprocessor output 312 may include standard code 306a, including subroutine 308a, which may be essentially identical to standard code 306 and subroutine 308.

Figure 4:
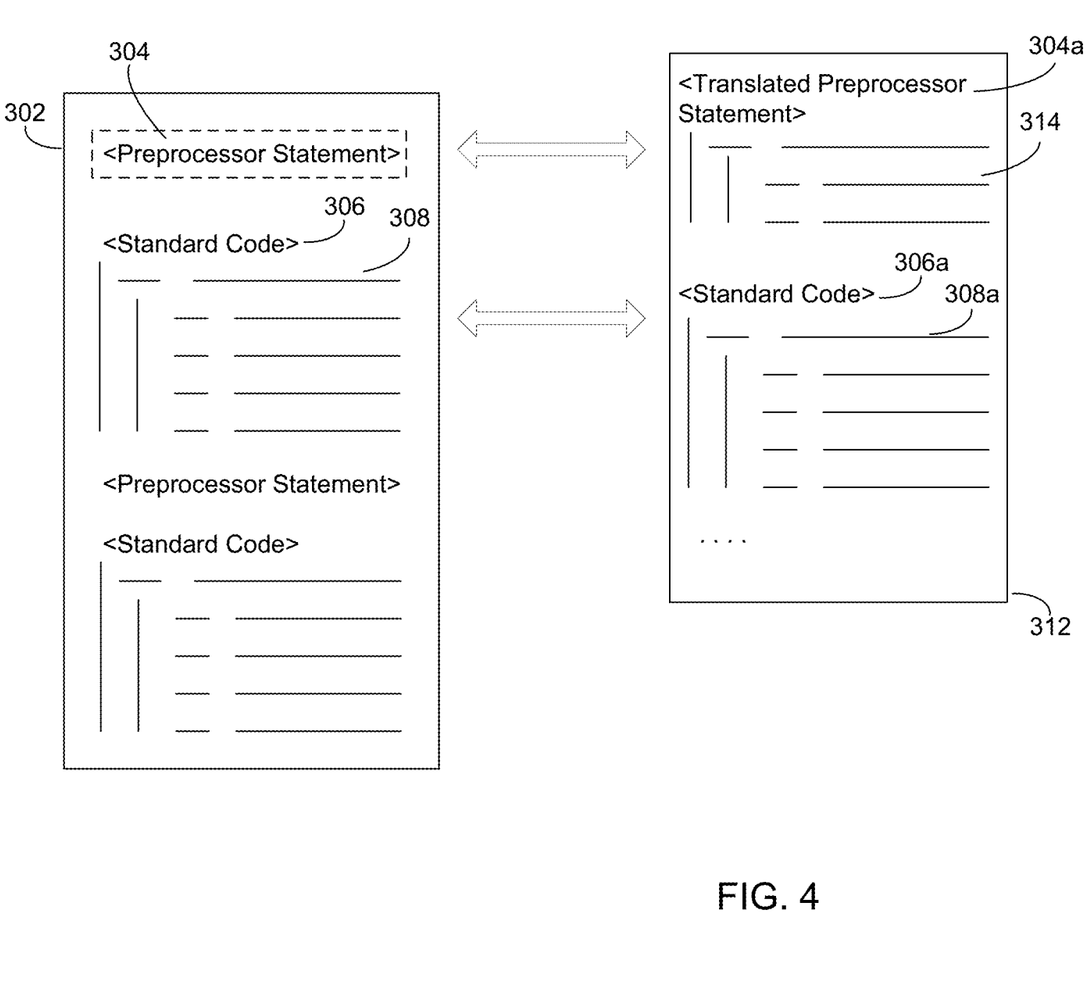
FIG. 4 is another diagrammatic view of an implementation of the preprocessor statement translation process of FIG. 1.

Referring now also to FIG. 4, PIP process 20 may identify 210 the location of preprocessor statement 304 (indicated by the dashed box around preprocessor statement 304) by comparing 208 code text 302 (or a token stream representing code text 302) with preprocessor output 312 (or a token stream representing preprocessor output 312). As indicated by the double arrows, PIP process 20 may identify 210 the location of preprocessor statement 304 by identifying that preprocessor statement 304 has been changed to translated preprocessor statement 304a, including subroutine 314, whereas standard code 306, including subroutine 308, does not vary from standard code 306a, including subroutine 308a. Because the preprocessor (e.g., once preferences 204 have been configured to indicate that comparing 208 the preprocessor output and the code text should ignore cosmetic transformations) may change only preprocessor statements (i.e., may not change standard code), a change between code text 302 and preprocessor output 312 may correspond to a location of a preprocessor statement. As such, identifying a change between code text 302 and preprocessor output 312 may permit PIP process 20 to identify 208 the location of the preprocessor statements.

Figure 5:
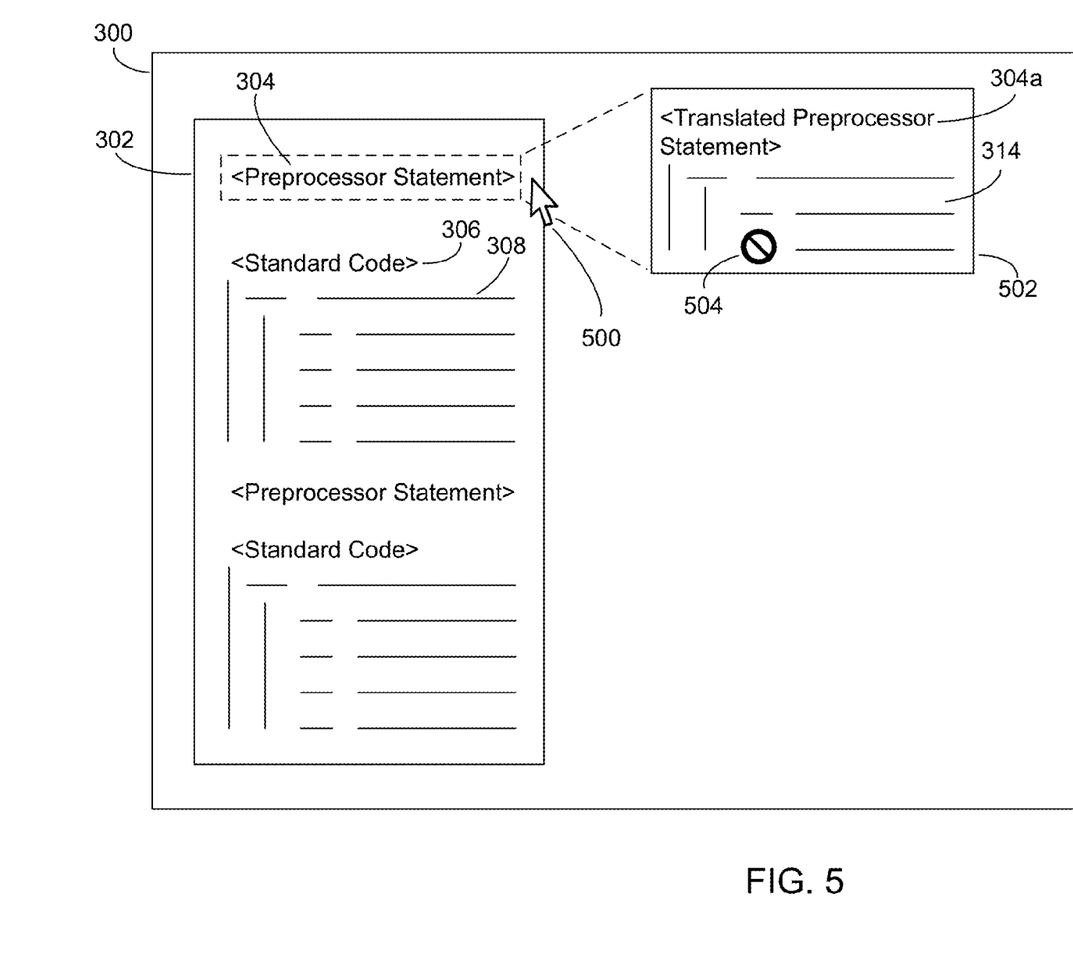
FIG. 5 is another diagrammatic view of an implementation of the preprocessor statement translation process of FIG. 1.

Continuing the above example and referring now also to FIG. 5, PIP process 20 may apply 228 a syntax-dependent tool based upon, at least in part, parsing 212 the software code text. Based upon applying 228 such a tool, for example, PIP process 20 may further provide 232 an indicator of an error associated with a preprocessor statement (e.g., preprocessor statement 304). For example, based upon a generated 214 representative model of the software code, application 228 of a syntax-dependent tool by PIP process 20 may indicate that translated preprocessor statement 304a includes an error (or other anomaly). As such, in response to mouse pointer 500 being placed near preprocessor statement 304, PIP process 20 may provide 232 temporary window 502, including indicator 504 of an error associated with translated preprocessing statement subroutine 314.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:
1. A computer-implemented method comprising:
identifying, by one or more computing devices, software code text, wherein the software code text includes one or more preprocessor statements;
translating, by the one or more computing devices, the software code text including the one or more preprocessor statements into a preprocessor output using, at least in part, one or more preprocessors associated with the software code text, the preprocessor output including one or more transformations of the one or more preprocessor statements into a set of expressions that represent intended functionality of the preprocessor statements and that are expressed using standard language and syntax of a relevant programming language of the software code text;

identifying, by the one or more computing devices, the one or more transformations of the software code text, including one or more transformations of the one or more preprocessor statements, based upon, at least in part, comparing the preprocessor output with the software code text;

identifying, by the one or more computing devices, one or more locations in the software code text associated with the one or more transformations, based upon, at least in part, comparing the preprocessor output with the software code text; and parsing the software code text, by the one or more computing devices, based upon, at least in part, lexing the software code text to generate an integrated token stream model, wherein the integrated token stream model includes a representation of a first token stream representing the software code text and one or more representations of one or more other token streams representing the one or more transformations of the software code text.

2. The method of claim 1 wherein lexing the software code text to generate the integrated token stream model comprises:

generating the first token stream representing the software code text, including lexing the one or more preprocessor statements as one or more adjunct tokens;

generating a series of secondary token streams representing replacement text associated with the one or more transformations of the software code text;

mapping one or more locations in the first token stream associated with the one or more transformations of the software code text to one or more corresponding token streams included in the series of secondary token streams; and mapping one or more token streams included in the series of secondary token streams to one or more corresponding locations in the source code text.

3. The method of claim 1 wherein parsing the software code text comprises:

generating a representative model of the software code text based upon, at least in part, the integrated token stream model, wherein the representative model represents one or more syntactic structures associated with the preprocessor output and wherein the one or more syntactic structures are mapped, based upon, at least in part, the integrated token stream model, to one or more corresponding locations in the software code text.

4. The method of claim 3 further comprising:

identifying one or more syntactical issues associated with the software code text based upon, at least in part, one or more of parsing the software code text and applying a syntax-dependent tool to the representative model of the software code text.

5. The method of claim 4 further comprising:

providing an indicator of an error associated with the one or more transformations of the software code text.

6. The method of claim 5 wherein the indicator includes a temporary window activated by an action associated with a location of an instance of the one or more preprocessor statements.

7. The method of claim 1 wherein one or more of translating the software code text and parsing the software code text is based upon, at least in part, a user preference.

8. A computer program product residing on a non-transitory computer-readable storage medium having a plurality of instructions stored thereon, which, when executed by a processor, cause the processor to perform operations comprising:

identifying software code text, wherein the software code text includes one or more preprocessor statements;

translating the software code text including the one or more preprocessor statements into a preprocessor output using, at least in part, one or more preprocessors associated with the software code text, the preprocessor output including one or more transformations of the one or more preprocessor statements into a set of expressions that represent intended functionality of the preprocessor statements and that are expressed using standard language and syntax of a relevant programming language of the software code text;

identifying the one or more transformations of the software code text, including one or more transformations of the one or more preprocessor statements, based upon, at least in part, comparing the preprocessor output with the software code text;

identifying one or more locations in the software code text associated with the one or more transformations, based upon, at least in part, comparing the preprocessor output with the software code text; and parsing the software code text based upon, at least in part, lexing the software code text to generate an integrated token stream model, wherein the integrated token stream model includes a representation of a first token stream representing the software code text and one or more representations of one or more other token streams representing the one or more transformations of the software code text.

9. The computer program product of claim 8 wherein lexing the software code text to generate the integrated token stream model comprises:

generating the first token stream representing the software code text, including lexing the one or more preprocessor statements as one or more adjunct tokens;

generating a series of secondary token streams representing replacement text associated with the one or more transformations of the software code text;

mapping one or more locations in the first token stream associated with the one or more transformations of the software code text to one or more corresponding token streams included in the series of secondary token streams; and mapping one or more token streams included in the series of secondary token streams to one or more corresponding locations in the source code text.

10. The computer program product of claim 8 wherein parsing the software code text comprises:

generating a representative model of the software code text based upon, at least in part, the integrated token stream model, wherein the representative model represents one or more syntactic structures associated with the preprocessor output and wherein the one or more syntactic structures are mapped, based upon, at least in part, the integrated token stream model, to one or more corresponding locations in the software code text.

11. The computer program product of claim 10 further comprising instructions for:

identifying one or more syntactical issues associated with the software code text based upon, at least in part, one or more of parsing the software code text and applying a syntax-dependent tool to the representative model of the software code text.

12. The computer program product of claim 11 further comprising instructions for:

providing an indicator of an error associated with the one or more transformations of the software code text.

13. The computer program product of claim 12 wherein the indicator includes a temporary window activated by an action associated with a location of an instance of the one or more preprocessor statements.

14. The computer program product of claim 8 wherein one or more of translating the first portion of the software code text and parsing the software code text is based upon, at least in part, a user preference.

15. A computer system comprising:
one or more processors; and
one or more memory architectures coupled with the one or more processors;
wherein the one or more processors are configured to:
identify software code text, wherein the software code text includes one or more preprocessor statements;
translate the software code text including the one or more preprocessor statements into a preprocessor output using, at least in part, one or more preprocessors associated with the software code text, the preprocessor output including one or more transformations of the one or more preprocessor statements into a set of expressions that represent intended functionality of the preprocessor statements and that are expressed using standard language and syntax of a relevant programming language of the software code text;
identify the one or more transformations of the software code text, including one or more transformations of the one or more preprocessor statements, based upon, at least in part, comparing the preprocessor output with the software code text;
identify one or more locations in the software code text associated with the one or more transformations, based upon, at least in part, comparing the preprocessor output with the software code text; and
parse the software code text based upon, at least in part, lexing the software code text to generate an integrated token stream model, wherein the integrated token stream model includes a representation of a first token stream representing the software code text and one or more representations of one or more other token streams representing the one or more transformations of the software code text.

16. The computer system of claim 15 wherein lexing the software code text to generate the integrated token stream model comprises:
generating the first token stream representing the software code text, including lexing the one or more preprocessor statements as one or more adjunct tokens;
generating a series of secondary token streams representing replacement text associated with the one or more transformations of the software code text;
mapping one or more locations in the first token stream associated with the one or more transformations of the software code text to one or more corresponding token streams included in the series of secondary token streams; and
mapping one or more token streams included in the series of secondary token streams to one or more corresponding locations in the source code text.

17. The computer system of claim 15 wherein parsing the software code text comprises:
generating a representative model of the software code text based upon, at least in part, the integrated token stream model, wherein the representative model represents one or more syntactic structures associated with the preprocessor output and wherein the one or more syntactic structures are mapped, based upon, at least in part, the integrated token stream model, to one or more corresponding locations in the software code text.

18. The computer system of claim 17 wherein the one or more processors are further configured to:
identify one or more syntactical issues associated with the software code text based upon, at least in part, one or more of parsing the software code text and applying a syntax-dependent tool to the representative model of the software code text.

19. The computer system of claim 18 wherein the one or more processors are further configured to:
provide an indicator of an error associated with the one or more transformations of the software code text.

20. The computer system of claim 19 wherein the indicator includes a temporary window activated by an action associated with a location of an instance of the one or more preprocessor statements.

* * * * *